United States Patent [19]

Sasame et al.

[11] Patent Number: 5,217,532

[45] Date of Patent: Jun. 8, 1993

[54] ROTATABLE MEMBER FOR FIXING APPARATUS AND FIXING APPARATUS USING SAME

[75] Inventors: Hiroshi Sasame; Masaaki Sakurai, both of Yokohama; Yasumi Yoshida, Kawasaki; Isamu Sakane, Ohtsu, all of Japan

[73] Assignees: Canon Kabushiki Kaisha, Tokyo; Kabushiki Kaisha I.S.T., Shiga, both of Japan

[21] Appl. No.: 279,068

[22] Filed: Dec. 2, 1988

[30] Foreign Application Priority Data

Dec. 4, 1987 [JP] Japan ................. 62-305739
Dec. 4, 1987 [JP] Japan ................. 62-305740
Dec. 4, 1987 [JP] Japan ................. 62-305741
Dec. 4, 1987 [JP] Japan ................. 62-305742

[51] Int. Cl.$^5$ .............................. B05C 1/08
[52] U.S. Cl. ........................ 118/60; 118/427; 249/115; 425/363
[58] Field of Search .......... 29/132; 118/60, 561, 118/562, 427, 68, 407, 419; 219/216; 355/282; 249/114.1, 115; 425/363, 367, 385, 394, 810; 264/2.3, 1.3

[56] References Cited

U.S. PATENT DOCUMENTS

| | | | |
|---|---|---|---|
| 3,345,942 | 10/1967 | Meltz | 29/132 |
| 3,435,500 | 4/1969 | Aser et al. | 29/132 |
| 3,941,635 | 3/1976 | Tavelle et al. | 29/132 |
| 3,941,636 | 3/1976 | Tavelle et al. | 29/132 |
| 4,145,599 | 3/1979 | Sakurai et al. | 219/216 |
| 4,149,797 | 4/1979 | Imperial | 29/132 |
| 4,154,876 | 5/1979 | Segawa et al. | 427/375 |
| 4,198,739 | 4/1980 | Budinger et al. | 29/132 |
| 4,226,886 | 10/1980 | Lakes | 264/49 |
| 4,257,699 | 3/1981 | Lentz | 29/132 |
| 4,258,089 | 3/1981 | Anderson et al. | 29/132 |
| 4,375,505 | 3/1983 | Newkirk | 29/132 |
| 4,475,804 | 10/1984 | Kanno et al. | 355/3 FU |
| 4,518,655 | 5/1985 | Henry et al. | 118/60 |
| 4,568,275 | 2/1986 | Sakurai | 432/60 |
| 4,580,033 | 4/1986 | Sakurai | 219/216 |
| 4,594,285 | 6/1986 | Osawa et al. | 427/195 |
| 4,595,274 | 6/1986 | Sakurai | 355/3 FU |
| 4,618,917 | 10/1986 | Sakurai | 355/3 FU |
| 4,632,855 | 12/1986 | Conlon et al. | 29/132 |
| 4,804,576 | 2/1989 | Kuge et al. | 29/132 |
| 4,842,944 | 6/1989 | Kuge et al. | 29/132 |
| 4,876,777 | 10/1989 | Chow | 29/132 |

OTHER PUBLICATIONS

Skeist, Irving, Handbook of Adhesives, Krieger Huntington, N.Y., (1962), title, copyright pages, pp. 8, 32-54.
Lynch, W., Handbook of Silicone Rubber Fabrication, Van Nostrand Reinhold, N.Y., (1978), p. 28.

*Primary Examiner*—Jay H. Woo
*Assistant Examiner*—Khanh P. Nguyen
*Attorney, Agent, or Firm*—Fitzpatrick, Cella, Harper & Scinto

[57] ABSTRACT

An image fixing rotatable member includes an elastic layer into which filler material is mixed, the elastic layer having a surface provided with pores with a porosity of 3-50%, and a resin layer applied and sintered on the elastic layer.

10 Claims, 7 Drawing Sheets

ROTATABLE MEMBER FOR FIXING APPARATUS AND FIXING APPARATUS USING SAME

FIELD OF THE INVENTION AND RELATED ART

The present invention relates to a rotatable member for an image fixing apparatus and an image fixing apparatus using the same, which are usable with an electrophotographic apparatus, an electrostatic recording apparatus or the like wherein an image is fixed.

An image fixing apparatus is widely used in which an unfixed toner image on a recording medium is fixed by pressure, particularly by pressure and heat, using a pair of rollers. The rollers, or the image fixing rotatable members, are required to have good releasing property, durability and image fixing properties.

Referring first to FIG. 11, a proposal has been made that a silicone rubber layer 400 is formed on a core metal 200, and fluorine resin material is applied on the rubber layer 400 and is sintered, thus producing an image fixing roller, as disclosed in U.S. Ser. No. 793,546 now U.S. Pat. No. 4,842,944, U.S. Ser. No. 831,729 now U.S. Pat. No. 4,804,576, U.S. Ser. No. 877,849 now abandoned, U.S. Ser. No. 094,418 now abandoned, U.S. Ser. No. 288,051 now U.S. Pat. No. 4,986,984, and U.S. Ser. No. 229,659 now abandoned.

The proposed image fixing roller is very good in the recording material conveying properties, releasing properties, wear durability and image fixing properties, because the thickness of the resin layer 600 can be made very thin, for example, 15-20 microns, and therefore, the surface resin layer can be formed without losing the elasticity of the elastic layer. However, it involves a problem in the durability. More particularly, with long term use, the surface resin layer 600 made of fluorine resin or the like is partly peeled from the elastic layer 400 made of rubber, with the result of insufficient image fixing properties.

SUMMARY OF THE INVENTION

Accordingly, it is a principal object of the present invention to provide an image fixing rotatable member and an image fixing apparatus using the same, wherein the rotatable member includes an elastic layer and a resin layer applied and sintered thereon, and wherein the bonding strength between the resin layer and the elastic layer is very high.

It is another object of the present invention to provide an image fixing rotatable member and an image fixing apparatus using the same, wherein the good image fixing properties, and the releasing properties can be maintained for long term.

It is a further object of the present invention to provide an image fixing rotatable member and an image fixing apparatus using the same wherein use is made with an elastic member having pores on the surface of the elastic layer provided by mixing filler powder into the elastic member and then removing the powder.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
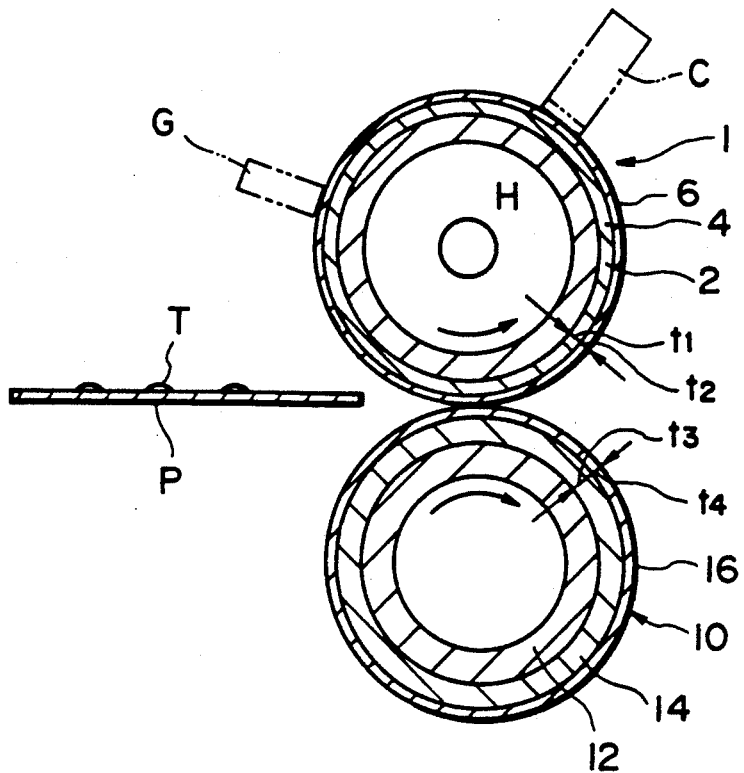
FIG. 1 is a sectional view of an image fixing apparatus according to an embodiment of the present invention.

Referring to the accompanying drawings, the preferred embodiments of the present invention will be described wherein like reference numerals are assigned to the elements having corresponding functions.

Referring now to FIG. 1, there is shown an image fixing apparatus according to an embodiment of the present invention. The image fixing apparatus comprises a heating image fixing roller 1, containing therein a heating source H, for contact with an unfixed toner image T carried on a recording sheet P and a back-up or pressing roller 10 for pressing the recording sheet P carrying the toner image to the fixing roller 1. The fixing roller 1 and the pressing roller 10 have similar structures, and include core metals 2 and 12, elastic layers 4 and 14 and resin layers 6 and 16, respectively.

The fixing apparatus further comprises a temperature detecting and control means G for detecting the surface temperature of the fixing roller 1 and maintaining it at a predetermined level which is an optimum temperature for fusing the toner, 160°-200° C., for example, and off-set prevention liquid applying means C for applying off-set preventing liquid such as silicone oil or the like to the surface of the fixing roller 1 and for cleaning the surface thereof.

The fixing roller 1 is comprised of the core metal 2 having a good thermal conductivity such as aluminum, the elastic layer 4 formed on the core metal 2 and made of silicone rubber, having a layer thickness $t_1$ of 0.3–0.8 mm and an impact resilience of 65–85%, in this embodiment, and a resin layer 6 formed on the elastic layer 4. The resin layer 6 is made of a fluorine resin material such as PFA resin (copolymer of tetrafluoroethylene resin and perfluoroalkoxyethylene resin) and PTFE resin (tetrafluoroethylene resin) and has a layer thickness $t_2$ of 10–25 microns and a film strength of not less than 50 kg/cm², in this embodiment.

The pressing roller 10 has a similar structure, but the core metal 12 is made of stainless steel or another steel, and the layer thickness $t_3$ of the silicone rubber elastic layer 14 is larger, for example, 4–10 mm, and an impact resilience thereof is 65–85%. The resin layer 16 is made of, similarly to the fixing roller 1, fluorine resin material such as PFA and PTFE resins, but the layer thickness $t_4$ is 5–35 microns, and the film strength is not lower than 50 kg/cm².

Each of the fixing roller 1 and the pressing roller 10 is symmetrical with respect to a longitudinal center thereof, and preferably, the fixing roller 1 (or the pressing roller 10) is reversely crowned, that is, the diameter thereof at the longitudinal center is slightly smaller than the diameters at the longitudinal ends.

The image fixing rotatable member according to the present invention is applicable to an image fixing roller 1 contactable to the unfixed toner image and/or to the pressing roller 10 which is not contacted to the image. However, the present invention is particularly effective when it is applied to the rotatable member contactable to the unfixed toner image, and the following description will be made as to the fixing roller 1.

Figure 2:
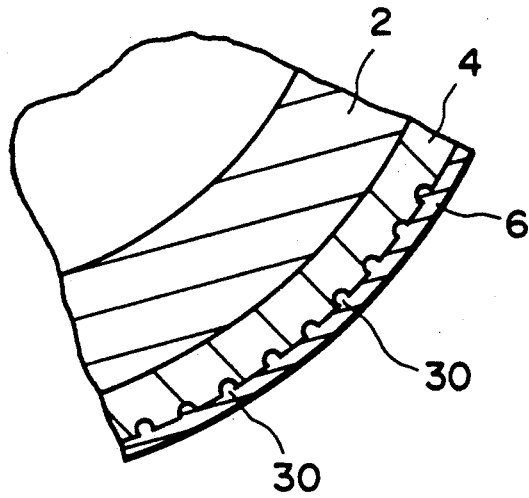
FIG. 2 is an enlarged sectional view of a part of an image fixing roller according to an embodiment of the present invention.

FIG. 2 is an enlarged sectional view of the fixing roller 1. The surface of the elastic layer 4 constituting a boundary between itself and the resin layer 6 is provided with numerous pores with the porosity of 3–50%. Into the pores 30, the resin material of the resin layer 6 is projected into and locked therein so as to provide a so-called anchoring effect, by which the elastic layer and the resin layer are strongly bonded, and therefore, the resin layer is prevented from peeling off the elastic layer even with a long term use, thus significantly increasing the durability.

More particularly, according to experiments and investigations, by the inventors, the durability of the fixing roller 1 is increased in proportion to the bonding strength between the elastic layer 4 and the resin layer 6, that is, the peeling force or strength.

Figure 3:
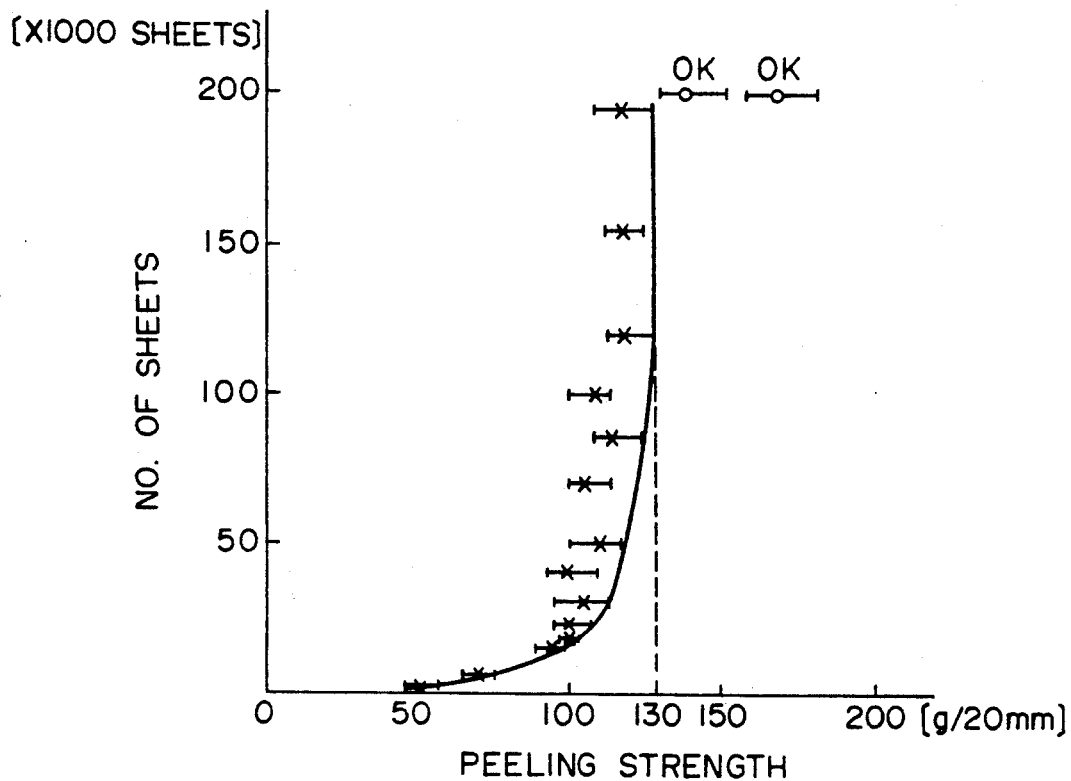
FIG. 3 is a graph showing a relationship between peeling force and number of sheets processed by the image fixing apparatus.

As shown in FIG. 3, particularly when the peeling strength is not less than 130 g/20 mm, the durability of not less than 200,000 sheets can be accomplished with certainty. The definition and method of measurement of the peeling strength will be described hereinafter.

Figure 4:
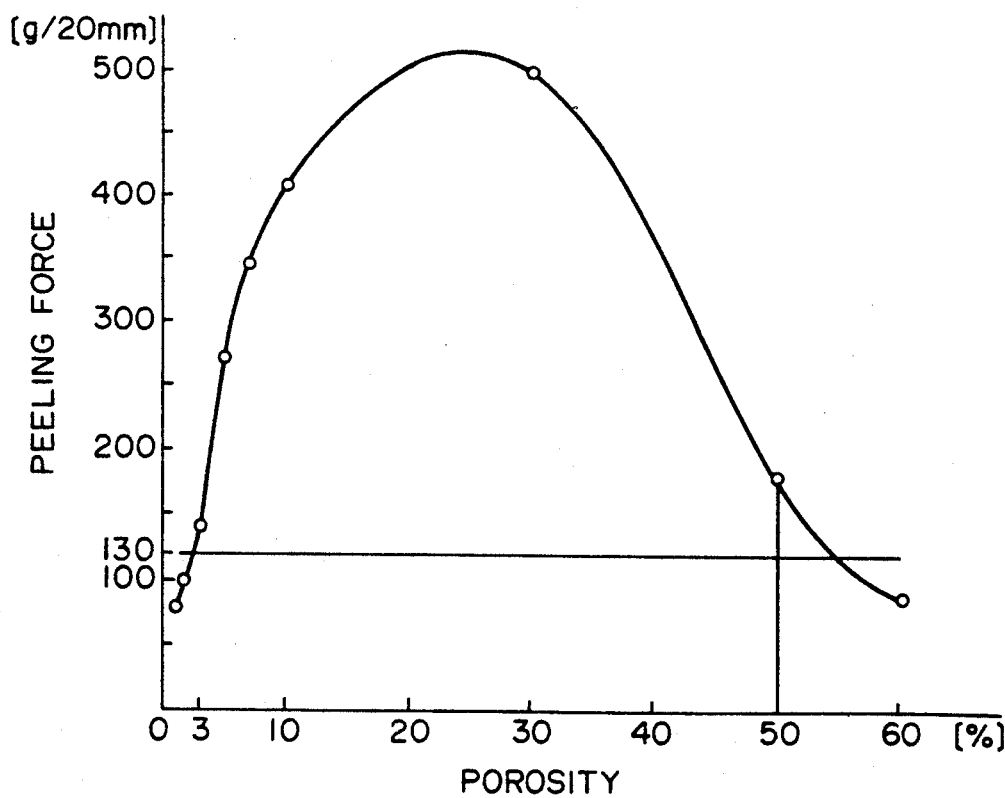
FIG. 4 is a graph showing a relation between a porosity and peeling force.
Figure 5:
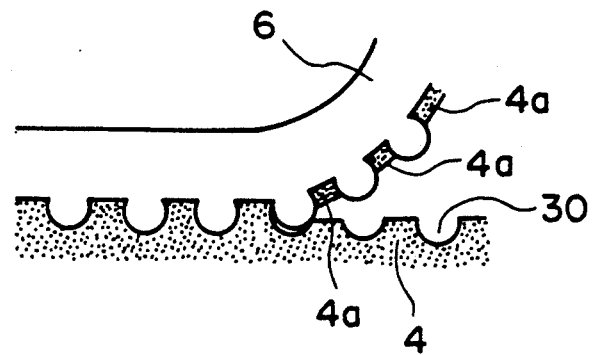
FIG. 5 is a sectional view of a part of the fixing roller according to the embodiment of the present invention.

On the basis of the finding, the inventors have made investigations as to the relation between the peeling strength and porosity of the roller according to the present invention, and have found that there is a relation as shown in FIG. 4, and it has been found that the porosity of 3–50 is preferable. As will be understood from FIG. 4, the peeling strength increases with increase of the porosity up to approximately 30% of the porosity, but the peeling strength decreases beyond it. It is considered that with the increase of the porosity, the resin material of the resin layer 6 is projected more into the pores 30 of the elastic layer, thus increasing the anchoring effect, that with the porosity higher than 30%, as shown in FIG. 5, the anchoring effect between the resin layer 6 and the elastic layer 4 becomes larger than the strength of the material constituting the elastic layer 4, and therefore, although the peeling between the elastic layer 4 and the resin layer 6 is prevented, a part 4a of the surface of the elastic layer 4 is torn from the resin layer 6, and in effect, the peeling strength decreases. In view of this, the porosity is particularly preferably 3–30%, since then the tearing hardly occurs.

Figure 6:
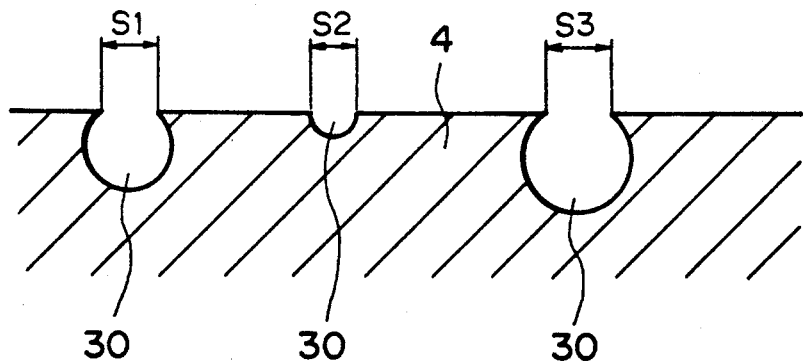
FIG. 6 is a sectional view illustrating the porosity.

Referring to FIG. 6, the porosity in this specification is defined as total opening (inlet) areas s1, s2, s3 . . . sN of the pores (s) divided by the total surface area (S) of the elastic layer 4, that is, s/S.

The description will be made as to the method of measurement for the porosity. Various methods of measurement are considered, but in this embodiment, it is measured in the following manner.

The surface of the elastic layer 4 is photographed in a magnification of 500, in a direction of 90±5 degrees relative to the elastic layer surface. The photograph is traced to produce a drawing for measurement, as shown in FIGS. 7 and 8, wherein the black portions indicate the pores 30.

The drawing is read by a reading device using CCD and having a resolution of 50 microns. The reading is A/D-converted to provide binary data. On the basis of the data, the percentage of the black level picture elements is determined relative to the total picture elements (one picture elements is 50 microns × 50 microns). The percentage is the porosity in this specification.

Figure 7:
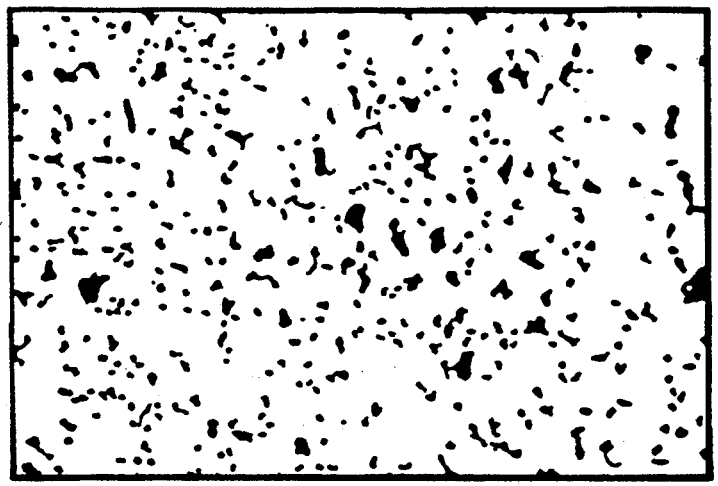
FIG. 7 shows pores on the surface of the elastic layer of the image fixing rotatable member according to an embodiment of the present invention.
Figure 8:
FIG. 8 illustrates pores on the elastic layer surface of an image fixing rotatable member according to a comparison example.

The actual measurement has revealed that the porosity of the example of FIG. 7 is 7%, and that of FIG. 8 is 1.5%.

FIG. 7 is obtained from the surface of the elastic layer of the roller according to a second example which will be described hereinafter, and FIG. 8 is obtained from the surface in a second comparison example, which will also be described hereinafter.

The fixing roller 1 (and the pressing roller 10) may be produced by various methods, but the preferable method of production will be described.

Since the fixing roller 1 and the pressing roller 10 can be produced in the same method, and the description will be made only as to the fixing roller. First, a core metal 2 is produced so as to have a predetermined diameter from aluminum material, and the elastic layer 4 is formed thereon. The elastic layer 4 is usually formed by vulcanizing silicone rubber (having a thermal conductivity of $1.4 \times 10^{-4} - 1.5 \times 10^{-3}$). In this embodiment, when the elastic layer 4 is produced, the silicone rubber which is the material of the elastic layer 4 is mixed with a filler material which is quartz powder having a particle size of 1–7 microns, and then the silicone rubber layer is formed by the vulcanization into a silicone rubber roller having a desired configuration. Preferably, the silicone rubber roller is slightly reverse-crowned wherein the longitudinal central portion has a slightly smaller diameter than the longitudinal end portions. Then, the surface of the silicone rubber roller is rotated, while an abrasive cloth is pressed thereto under a predetermined pressure, 1 kg/cm² for example over the entire longitudinal length by longitudinally reciprocating it, the abrasive cloth having a roughness sufficient to remove the quartz powder projected from the surface of the elastic layer without substantially abrading the elastic layer surface. By doing so, the quartz powder on the surface is forced to be removed, so that a number of pores 30 are provided on the roller surface. The porosity can be controlled by controlling amount of removal of the filler material such as the quartz powder mixed into the silicone rubber. The amount of removal is controlled by, for example, controlling the amount of the filler material mixed thereinto, the roughness and/or material of the abrasive cloth and/or the pressure thereof to the elastic layer. The quartz powder can be removed from the surface of the silicone rubber roller by a strong sand blasting treatment, but the removal by the abrasive cloth is preferable.

The surface of the rubber roller now having the desired porosity in the manner described above is coated with unsintered fluorine resin material, such as fluorine resin dispersion (the fluorine resin powder is dispersed in water with a surface active agent), or the fluorine resin in the form of enamel or powder, over the entire length of the rubber layer by spray painting, electrostatic painting, powder painting or the like, to provide a uniform thickness layer. At this time, a part of the dispersion enters the pores 30 formed on the surface of the rubber roller. The average particle size of the fluorine resin powder in the dispersion is not more than 1 micron, preferably not more than 0.5 micron. On the other hand, the average particle size of the quartz powder mixed into the elastic layer is larger than that of the fluorine resin particle, more particularly, preferably 1–7 microns, and further preferably not less than 3 microns. By selecting the sizes of the fluorine resin particles and the quartz particles, the pores 30 provided by removing the quartz particles from the surface of the elastic layer is sufficiently larger than the size of the flourine resin particle, and therefore, the fluorine resin particle easily enter the pores 30, by which the anchoring effect, that is, the bonding effect is sufficiently provided.

The dispersion or the like of fluorine resin applied in a uniform thickness in the manner described above becomes a resin coating film by being heated up to a temperature not less than the crystalline melting point of the fluorine resin, 327° C., for example. Therefore, it is desirable that the silicone rubber roller on which the unsintered fluorine resin is applied is heated to a crystalline melting temperature (327° C. for PTFE resin, and 306° C. for PFA resin).

Although the silicone rubber itself has excellent rubber properties such as an impact resilience and compression set, it is smoked or depolymerized if it is heated above 300° C., or particularly, higher than 306° C. or 327° C. This obstructs formation of good fluorine resin layer, and deprives the rubber properties of the silicone rubber.

In consideration of those, the sintering method is preferably such that the applied fluorine resin is heated up to the crystalline melting point, while maintaining the silicone rubber roller at a temperature not producing the smoking or the depolymerization (not higher than 300° C. at maximum). More particularly, examples of preferable methods are the one wherein the rubber layer is strongly cooled from the inside of the core metal, while quickly heating the unsintered surface fluorine resin, and a dielectric heating method wherein the use is made with the fact that the dielectric loss tangent of the liquid fluorine resin (dispersion) is larger than the dielectric loss constant of the rubber layer.

In those method, a thermal gradient is substantially produced in the silicone rubber layer in the direction of the thickness thereof, but the silicone rubber is heated up to 260°–280° C. approximately, whereas the unsintered fluorine resin is heated up to 340°–380° C. which is not lower than the crystalline melting point which is 327° C. for the PTFE resin for approximately 5–10 min.

After the sintering, the roller is quickly cooled. By the cooling, a sintered fluorine resin surface layer having such resin properties that the degree of crystallinity is not more than 95%, that the tensile strength is not less than 50 kg/cm$^2$ and that the contact angle relative to the water is not less than 100 degrees, is formed on the silicone rubber roller and is strongly bonded thereto with sufficiently large thickness. Simultaneously, the fluorine resin layer in the pores 30 on the surface of the rubber roller is sintered with strong bonding strength to the rubber roller so as to provide the strong anchoring effect.

Therefore, the back-up silicone rubber layer exhibits the same rubber properties as before formation of the resin layer, whereas the surface fluorine resin layer exhibits the completely sintered resin properties, and in addition those layers are strongly bonded by the resin material in the pores of the elastic layer. By adding to the elastic layer a material which shows good affinity with the resin material constituting the resin layer, more particularly, by adding in the elastic layer the fluorine resin of the resin layer when the resin layer is of the fluorine resin, the fluorine resins contained in the resin layer and the elastic layer are melted in the pores during the sintering, and therefore, they are combined with complete contactness therebetween, thus enhancing the anchoring effect between the elastic layer and the resin layer. In the manner described above, the strong bonding strength can be provided between the elastic layer and the resin layer without a bonding layer. More particularly, even if a shearing stress is locally applied between the elastic layer and the resin layer by separating pawls press-contacted to the fixing roller to separate the recorded recording sheet from the fixing roller, the resin layer is prevented from being peeled off the elastic layer.

Therefore, the image fixing roller according to the present invention is so durable that 200,000 sheets can be processed.

The description will be made as to the Examples of embodiment and Comparison Examples.

EXAMPLE 1

The image fixing roller 1 according to this embodiment was manufactured in the following manner. First, an aluminum core metal 2 was prepared which was finished to have a central diameter of 48.435 mm with the amount of reverse-crown of 125 microns and to have a thickness of 5 mm. The surface thereof was sand-blasted, degreased and dried.

A silicone primer was applied on the core metal 2 with a thickness of 7 microns and was heated at 120° C. for 20 minutes. Then, a sheet of vulcanized silicone rubber was wrapped and was press-vulcanized at 160° C. for 30 min. It was machined to a thickness of 0.5 mm of the rubber layer, whereby the silicone rubber roller was produced.

The vulcanized silicone rubber contained 100 parts by weight of methyl vinyl silicone rubber, 70 parts by weight of quartz particles having an average particle size of approximately 50 microns and 10 parts by weight of aerosol silica having an average particle size of 0.015 micron, and it exhibits the hardness of 80 degrees (JIS A).

The surface of the silicone rubber roller after the vulcanization was sand-blasted, so that the quartz particles on and adjacent the roller surface were beaten out of the elastic layer. The quartz particles were removed from the surface of the roller using an abrasive cloth made of Normex fibers coated with PTFE (tetrafluoroethylene resin). More particularly, the abrasive cloth was press-contacted to the entire length of the roller under the pressure of 1 kg/cm$^2$, while the roller was rotated at 4 rpm, and while the abrasive cloth is reciprocated for 30 min. at 50 mm/sec, thus forcedly removing the quartz particles from the roller surface.

Then, the roller surface was cleaned by water and was dried. Numerous pores 30 were formed on the roller surface, and the porosity was 7%.

Unsintered PTFE (tetrafluoroethylene resin) dispersion, which was available from Daikin Kabushiki Kai7 sha, Japan under the name of tetrafluoroethylene resin dispersion D71, was coated on the entire length of the rubber roller having the above porosity, with a thickness of 20 microns by a roll coater at a low temperature of 13° C.

The fluorine resin dispersion applied with uniform thickness was sintered by a dielectric heating apparatus.

Figure 9:
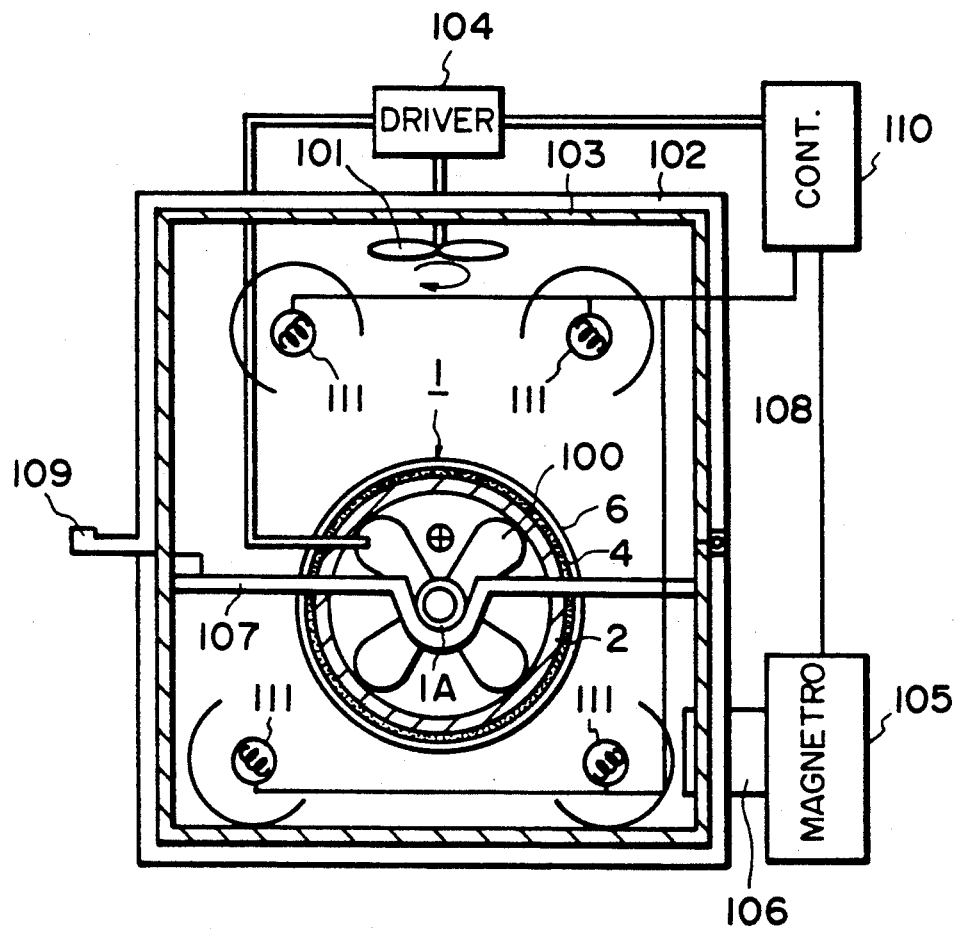
FIG. 9 is a sectional view of an apparatus for manufacturing the image fixing rotatable member according to an embodiment of the present invention.

The used dielectric heating apparatus was as shown in FIG. 9, which uses both of the dielectric heating and an external infrared heating. The apparatus comprises a magnetron 105, a waveguide 106 for propagating a high frequency wave (950 MHz–2450 MHz) produced by the magnetron 105, an openable resin container 102 connected with the waveguide and having a metal high frequency wave reflecting plate 103 at its inside, and two external infrared lamps 111 with reflecting shades at each of the upper and lower positions.

In the resin container 102, there are a fan 100 for producing an air flow in the central bore of the image fixing roller 1, a fan 101 for producing an air flow in the container 102, both of which are driven by an external driving means. The container is openable about a hinge 108, and the upper part thereof is provided with a grip, and the lower part is provided with an arm 107 for positioning a flange 1A of the roller 1.

The driving means 104, the magnetron 105 and the infrared lamp 111 are controlled by control means 110.

Since the fixing roller 1 has a back-up silicone rubber layer 2 and a surface fluorine resin dispersion, and therefore, the high frequency wave is absorbed more in the dispersion than in the silicone rubber layer, since the dielectric constant of the dispersion is larger than the other. Therefore, the fluorine resin dispersion is quickly heated by the heating by the high frequency wave, by the infrared rays and by the constant temperature container. More particularly, it is heated at 340° C. for 15 min. to be completely sintered. During the heating, the silicone rubber layer having a smaller absorption rate for the high frequency wave is not so heated as the dispersion, more particularly, it is heated at approximately 280° C. In this manner, the thermal gradient is substantially produced in the silicone rubber in the direction of the thickness thereof, and is heated up to 260°–280° C. approximately, but the unsintered fluorine resin is heated for approximately 5–10 min. at a temperature not less than the crystalline melting point, more particularly at the sintering temperature of 340°–380° C. which is not less than 327° C., for PTFE resin.

After the sintering, the roller was quickly cooled. By the cooling, a sintered fluorine resin layer 6 exhibiting such resin properties that the crystallinity was 92%, that the tensile strength was 120 kg/cm$^2$ and that the contact angle relative to the water was 110 degrees, was formed on the silicone rubber roller with high bonding strength and with sufficient thickness, more particularly 20 microns, the final diameter of the fixing roller 1 was 49.475 mm.

The pressing roller 10 was produced in the similar manner with the exception that the core metal was made of steel, and the thicknesses of the elastic layer 14 and the resin layer 16 were 6 mm and 25 microns, respectively. The final outside diameter of the pressing roller 10 was the same as the fixing roller 1. The porosity of the elastic layer of the heating roller 10 was 7%.

EVALUATION

Using the image fixing roller 1 and the pressing roller 10, test runs were performed to investigate the fixing, releasing and bonding properties and the durability. The testing conditions were such that the surface temperature of the fixing roller 1 was controlled to be maintained at 180° C., that A4 size sheets were processed at 270 mm/sec, and that 40 sheets were processed per minute.

The image fixing properties were evaluated on the basis of the fixation rate of nine solid black circular images each having a diameter of 24 mm on a A4 size (JIS) transfer sheet having a basis weight of 80 g/m$^2$ at 10° C. ambience. The fixation rate was determined on the basis of the image density D0 of the circular image, and an image density D1 after being rubbed through 10 reciprocation under the pressure of 40 g/cm$^2$ with Kojin wiper which was unwoven cloth available from Kabushiki Kaisha Kojin, Japan under the trade name of "paper waste" which was disposable wiping paper having a crepe rate of 32±3%, weight of 35±3 g/m$^2$, a tensile strength in the longitudinal direction of not less than 0.4 kg/15 mm and a thickness of approximately 200 microns. More particularly, the fixation rate was determined as $(D1/D0)\times 100\%$.

The densities D1 and D2 were measured by MacBeth reflection densitometer, and the density D0 was controlled so as to be not less than 1.0 and not more than 1.1.

The releasing properties were determined by continuously forming 100 whole surface solid black images on the transfer sheets under the same conditions, and subsequently, passing a blank sheet, and observing the contamination of the blank sheet.

The bonding strength between the elastic layer and the resin layer was determined in the following manner. The fluorine resin surface layer was partly peeled with a width of 20 mm, and the peeled portion was gripped by a tension gauge having a full scale of 100–300 g, and it was peeled in the direction of 90 degrees from the circumferential direction, and the reading of the tension gauge was deemed as the bonding strength. During this test, the surface temperature of the fixing roller was maintained at 25°±2° C.

The durability was determined in the following manner. The surface temperature was maintained at 180° C., and A4 size sheets were continuously passed through the fixing apparatus at the sheet feeding speed of 270 mm/sec and at a speed of 40 sheets/min, and the number of the total sheets passed until the resin layer starts to be peeled off the elastic layer was deemed as the durability.

The fixing, releasing and bonding properties were investigated for the image fixing roller 1 according to Example 1. The results were:

Fixing property 91% at worst
94% on the average (nine portions)
Releasing property: no contamination observed Bonding property: 340 g/20 mm
Durability: no damage was observed in the fixing roller and in the pressing roller after 200,000 sheets were processed; and they are further usable Therefore, it has been confirmed that the rollers according to Example 1 have practically sufficient performance in all of the evaluation items.

COMPARISON EXAMPLE 1

An image fixing roller and a pressing roller were produced in the similar manner as in Example 1. In this Comparison Example, the process of removing the quartz particles from the surface of the silicone rubber layer (elastic layer) was not performed, and therefore, the resin layer was directly formed. Therefore, the porosity of the elastic layer surface prior to formation of the resin layer was approximately 1.5%.

Under the same conditions as the Example 1, the fixing, releasing, bonding properties and the durability were investigated for the image fixing roller 1 and the pressing roller 10 according to this Comparison Example. The results were:
Fixing property: 90% at worst
  94% on the average (nine portions)
Releasing property: no contamination observed
Bonding property: 100 g/20 mm
Durability: the resin layer of the fixing roller was partly removed from the elastic layer at a portion where it is contacted to the separating pawl after 300,000 sheets were processed; and the resin layer of the pressing roller was partly removed from the elastic layer at a portion corresponding to the lateral end of the sheet after 400,000 sheets were processed.

Each of the rollers of the Example 1 shows the properties equivalent to the rollers of Example 1 with respect to the image fixing and releasing properties, but it is inferior in the bonding strength and the durability as compared with the roller according to the present invention since the anchoring effect can not be expected.

EXAMPLE 2

The image fixing roller and the pressing roller were produced in the same manner as in Example 1. The Example 2 is different from the Example 1 only in that the vulcanized silicone rubber constituting the elastic layer contains 100 parts by weight of methyl vinyl silicone rubber, 55 parts by weight of the quartz particle having an average particle size of approximately 8 microns and 10 parts by weight of aerosol silica having an average particle size of approximately 0.015 micron, and it had a hardness of 65 degrees (JIS A). Therefore, the porosity of the surface of the elastic layer before the resin layer was formed was 7%, the same as in Example 1.

The image fixing, releasing and bonding properties and durability were investigated for the fixing roller 1 and the pressing roller 10 of Example 2 under the same conditions as in Example 1. The results were:
Fixing property: 93% at worst
  95% on the average (nine portions)
Releasability: no contamination observed
Bonding strength: 350 g/20 mm
Durability: no damage was observed in the fixing roller and the pressing roller after 200,000 sheets were processed, and further operation was possible.

It has been confirmed, therefore, each of the rollers according to Example 2 has practically sufficient performance in each of evaluation items.

As compared with Example 1, the elasticity of the elastic layer is increased because of the lower hardness of the elastic layer, and the image fixing properties are improved. With the increase of the elasticity, the damper effect can be expected against the impact provided by the pawls or the like, and the impact absorbing power is improved, with the improvement of the durability.

When the silicone rubber is used for the elastic layer, the rubber hardness is preferably not less than 30 degrees and not more than 80 degrees, and further preferably, the elongation is not less than 120%, and the stress for 100% elongation is not less than 10 kg/cm$^2$ with sufficient rubber elasticity.

COMPARISON EXAMPLE 2

Image fixing roller and pressing rollers are produced in the same manner as in Example 2. In this Comparison Example, the process for removing quartz particles from the surface of the silicone rubber layer (elastic layer) was not performed, but the resin layer was directly formed thereon. The porosity on the surface of the elastic layer prior to formation of the resin layer was approximately 1%.

Under the same conditions as in Example 1, the image fixing, releasing, bonding properties and durability were investigated for the fixing roller 1 and the pressing roller 10 for the Comparison Example 2. The results were:
Fixing property: 93% at worst
  95% on the average (nine portions)
Releasing property: no contamination observed
Bonding property: 100 g/20 mm
Durability: The resin layer of the fixing roller was partly removed from the elastic layer at a portion where it is contacted to the separation pawl, after 400,000 sheets were processed; and the resin layer of the pressing roller was partly removed from the elastic layer at a portion which corresponds to the lateral edge of the sheets, after 300,000 sheets were processed.

Each of the rollers according to the Comparison Example 2 has the properties equivalent to that of Example 2 with respect to the fixing property and the releasing property, but the roller according to this Comparison Example wherein the anchoring effect can not be expected is inferior to the roller according to Example 2 in the bonding strength and the durability.

Figure 10:
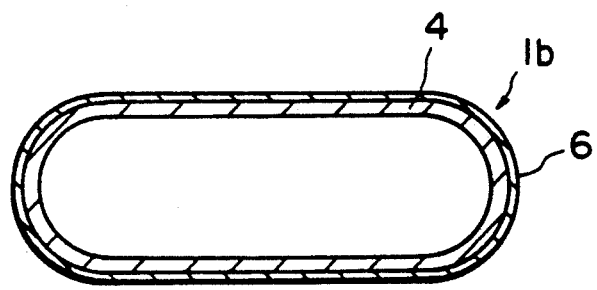
FIG. 10 is a sectional view of an image fixing rotatable member according to another embodiment of the present invention.
Figure 11:
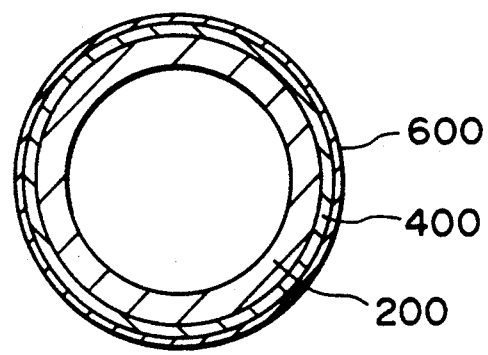
FIG. 11 is a sectional view of an image fixing roller according to background art.

In the foregoing description, a heat-fixing apparatus has been taken as an Example of preferable applications of the elastic rotatable member according to the present invention. However, the present invention is applicable to a pressure-fixing apparatus or the like wherein the toner image is pressure-fixed with light pressure or wherein the image is simultaneously transferred and fixed. In the foregoing embodiment, the image fixing apparatus is constituted by two rollers. However, it may be constituted by one or three or more rollers. In addition, the present invention is applicable to a heating roller or to a pressing roller in various types of apparatus. As shown in FIG. 10, the rotatable member according to the present invention is not limited to the form of a roller, but may be in the form of a belt, for example, an intermediate belt for simultaneous image transfer and fixing. Particularly, when the fluorine resin is used for the resin layer, the rotatable member is provided with the releasing property and the elasticity, and with therefore, the good image transfer property, good cleaning property (easy to clean) and good durability to wear, and therefore, it is preferable.

As for the elastic layer, fluorine rubber or the like is usable as well as the silicone rubber, and as for the resin layer, silicone resin material or the like can be used as well as the fluorine resin material.

The description will be made as to the filler material in the elastic layer 4.

Figure 12:
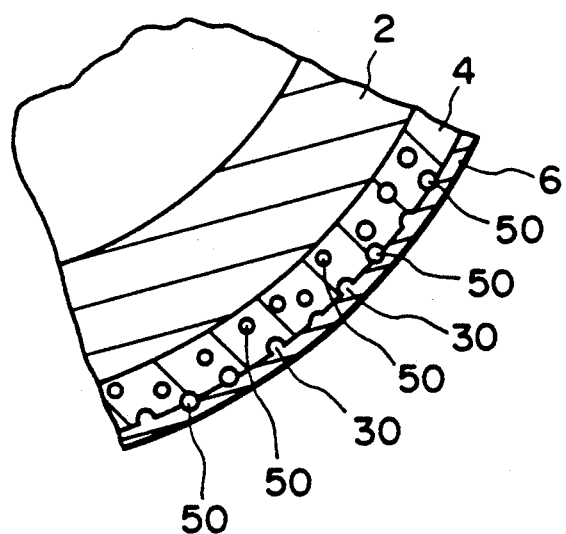
FIG. 12 is an enlarged sectional view of a part of the image fixing roller according to an embodiment of the present invention.

As shown in FIG. 12, a filler material having a diameter larger than the resin particles applied on the elastic layer 4 is mixed into the elastic layer. On the surface of the elastic layer 4 which is to be contacted to the resin layer 6, the filler material 50 fixed in and dispersed in the elastic layer is partly exposed.

By partly exposing the filler material on the surface of the elastic layer, the affinity between the elastic layer 4 and the resin layer 6 is improved, so that the bonding strength therebetween is increased.

In addition, by the filler material 50 on the surface of the elastic layer being naturally removed during the manufacturing process of the rubber roller, or by the filler material 50 being forcedly removed, pores 30 are formed on the surface of the elastic layer 4, whereby the bonding strength between the elastic layer and the resin layer is further increased. That is, the resin material of the resin layer 6 formed on the elastic layer 4 is anchored into the pores 30. In an embodiment which will be described hereinafter, the resin material as well as the filler material 50 is mixed into the elastic layer.

Therefore, the fluorine resin constituting the elastic layer 6 enters the pores 30, and therefore, during the sintering of the resin layer, the resin in the elastic layer and the resin in the resin layer are fused together on the surface of the elastic layer, and in addition, in the pores 30, the resin in the elastic layer and the resin in the resin layer are fused together, whereby the elastic layer and the resin layer are more strongly bound. As a result, the layers are not separated for a long term use, and therefore, the durability is significantly improved.

The resin material mixed into the elastic layer is similar to the resin material of the resin layer applied thereon, more particularly, when the resin applied and sintered is a fluorine resin, the resin mixed into the elastic layer is also a fluorine resin, preferably. The strongest bonding strength can be obtained when the materials are same, that is, if the resin of the resin material is PTFE resin, the resin mixed into the elastic layer is also PTFE resin; and if the resin material of the resin layer is PFA, the resin contained in the elastic layer is also PFA. In order to make it easier for the fluorine resin particles constituting the resin layer to enter the pores 30, the particle size the size of the pores 30 is made larger than the particle size of the fluorine resin particles for the resin layer. If the particle size of the filler material is too large, the surface of the rubber layer becomes rough with the result of easy non-uniformness of the image fixing, or loss of sufficient rubber elasticity. According to the investigation and experiments by the inventors, the limit is 20 microns.

Therefore, the filler material mixed into the elastic layer preferably has an average particle size of 1-2 microns, and the material thereof is one or more selected from quartz particles, diatomaceous earth, metal powder, metal oxide powder and ceramic, and 30-120 parts by weight, preferably 40-90 parts by weight, are mixed to 100 parts by weight of rubber material. This is because the peeling strength between the elastic layer and the resin layer is increased with increase of amount of the filler material, and sufficient bonding strength can be obtained when it is not less than 30 parts by weight, but if it is not less than 120 parts, by weight the hardness of the elastic layer is too large with the result of problems in the sheet conveying and image fixing properties.

The fluorine resin mixed and dispersed in the layer is 3-30 parts by weight, preferably 5-25 elastic parts by weight.

With the increase of the porosity of the pores 30, more of the resin material of the resin layer 6 enters the pores 30 of the elastic layer 4, and therefore, the anchoring effect is increased, and therefore, it is preferable.

EXAMPLE 3

The image fixing roller 1 according to this embodiment was manufactured in the following manner. First, an aluminum core metal 2 was prepared which was finished to have a central diameter of 48.435 mm with the amount of reverse-crown of 125 microns and to have a thickness of 5 mm. The surface thereof was sand-blasted, degreased and dried.

A silicone primer was applied on the core metal 2 with a thickness of 7 microns and was heated at 120 degrees for 20 minutes. Then, a sheet of vulcanized silicone rubber was wrapped and was press-vulcanized at 160° C. for 30 min. It was machined to a thickness of 0.5 mm of the rubber layer, whereby the silicone rubber roller was produced.

The vulcanized silicone rubber contained 100 parts by weight of methyl vinyl silicone rubber, 15 parts by weight of PTFE particles having an average particle size of approximately 0.2 micron, 55 parts by weight of quartz particles having an average particle size of approximately 8 microns and 10 parts by weight of aerosol silica having the average particle size of 0.015 micron, and it exhibits the hardness of 65 degrees (JIS A).

Then, the roller was cleaned by water and was dried.

Unsintered PTFE (tetrafluoroethylene resin) dispersion, which was available from Daikin Kabushiki Kaisha, Japan under the name of tetrafluoroethylene resin dispersion D-1, containing PTFE particles having a particle size of approximately 0.2 micron, was coated on the entire length of the rubber roller, with a thickness of 20 microns by a roll quarter at a low temperature of 13° C.

The fluorine resin dispersion applied with uniform thickness was sintered by a dielectric heating apparatus shown in FIG. 9.

The sintering and quick cooling steps, and the roller diameter and others are the same as in Example 1.

A pressing roller 10 was produced in the similar manner with the exception that the core metal was made of steel, and that the thicknesses of the elastic layer 14 and the resin layer 16 were 6 mm and 25 microns, respectively. The final roller diameter thereof was the same as the fixing roller.

EVALUATION

The fixing, releasing and bonding properties were investigated for the image fixing roller 1 according to Example 1 under the same conditions as in Example 1. The results were:
Fixing property: 90% at worst
94% on the average (nine portions)
Releasing property: no contamination observed
Bonding property: 300 g/20 mm Durability: no damage was observed in the fixing roller and in the pressing roller after 200,000 sheets were processed; and they are further usable.

Therefore, it has been confirmed that the rollers according to Example 3 have practically sufficient performance in all of the evaluation items.

COMPARISON EXAMPLE 3

An image fixing roller and a pressing roller were produced in the similar manner as in Example 3. This Comparison Example was different from Example 3 in that the silicone rubber contained 100 parts by weight of methyl vinyl silicone rubber and 20 parts by weight of aerosol silicon having an average particle size of 0.015 microns without PTFE particles and large size quartz paraticles added. The rubber had a hardness of degrees (JIS A hardness).

The resin layer was made of PTFE dispersion having a paraticle size (0.3 micron on the average) layer than that of the aerosol silica.

Under the same conditions as the Example 1, the fixing, releasing, bonding properties and the durability were investigated for the image fixing roller 1 and the pressing roller 10 according to this Comparison Example. The results were:

Fixing property: 92% at worst
  94% on the average (nine portions)
Releasing property: no contamination observed
Bonding property: 600 g/20 mm
Durability: the resin layers of the fixing roller at the pressing roller were partly removed from the elastic layer at a portion where it was contacted to the separating pawl, after 300,000 sheets were processed.

Each of the rollers of the Comparison Example 1 shows the properties equivalent to the rollers of Example 1 with respect to the image fixing and releasing properties, but it is inferior in the bonding strength and the durability as compared with the roller according to the present invention.

EXAMPLE 4

The image fixing roller and the pressing roller were produced in the same manner as in Example 3. The Example 2 is different from the Example 3 in that a predetermined amount of the vulcanized silicone rubber constituting the elastic layer was removed, to forcedly form pores 30, and then the resin layer as formed.

The surface of the silicone rubber roller after the vulcanization was sand-blasted to heat the quartz partaicles on or adjacent the surface of the roller out of the elastic layer. Then, an abrasive cloth which is Normex fibers coated with PTFE resin as press-contacted to the entire length of the roller under the pressusre of 1 kg/cm$^2$, while the roller was being rotated at 4 rpm, and while reciprocating the abrasive cloth at a speed of 50 mm/sec, for 30 min. to forcedly remove the quartz paraticles from the roller surface.

The roll surface was them cleaned by water and dryed. Numerous pores 30 were formed.

The fluorine resin was applied and sintered in the same manner as the Example.

The image fixing, releasing and bonding properties and durability were investigated for the fixing roller 1 and the pressing roller 10 of Example 4 under the same conditions as in Example 3. The results were:

Fixing property: 90% at worst
  93% on the average (nine portions)
Releasability: no contamination observed
Bonding strength: 370 g/20 mm
Durability: no damage was observed in the fixing roller and the pressing roller after 200,000 sheets were processed, and further operation was possible.

It has been confirmed, therefore, each of the rollers according to Example 4 has practically sufficient performance in each of evaluation items.

As compared with Example 3, the image fixing properties are equivalent, but the durability has greatly be improved.

This is because the filler material is forcedly removed from the surface of the elastic layer, so that the anchoring effect is enhanced.

The description will be made as to the steps of removing the filler material from the surface of the elastic layer in Examples 1, 2 and 4.

Figure 13:
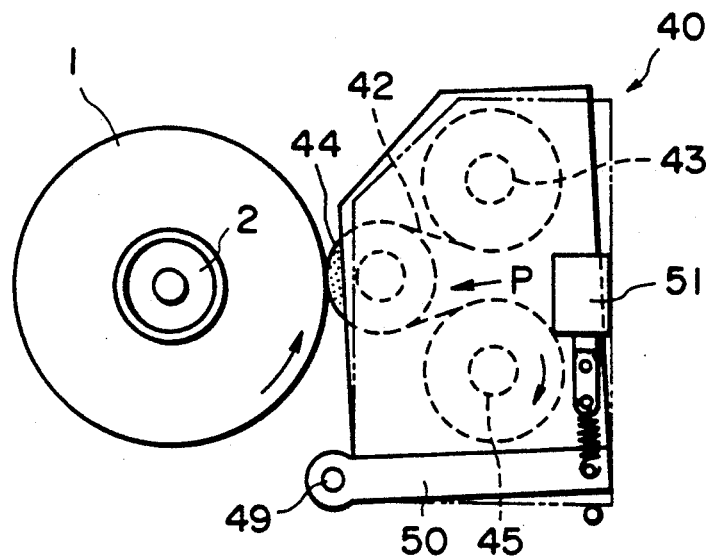
FIG. 13 is a sectional view of an apparatus used for manufacturing an image fixing rotatable member according to an embodiment of the present invention.
Figure 14:
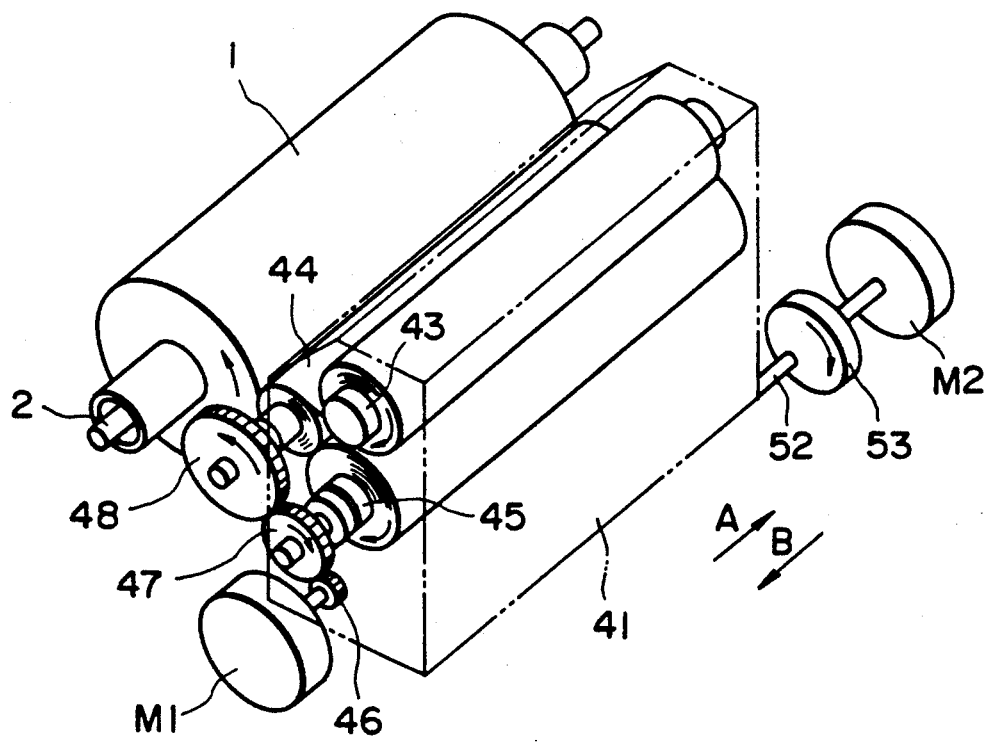
FIG. 14 is a perspective view of an apparatus of FIG. 13.

FIGS. 13 and 14 are sectional and perspective views of the filler removing apparatus 40 usable in producing the rotatable members according to the present invention.

The removing apparatus 40 includes a housing 41 which contains a supply roll 43 on which an abrasive cloth 42 is wound, a pressing roll 44 for pressing the abrasive cloth 42 supplied from the supply roll 43 to the surface of the rubber roller 1 over the entire length thereof and a take-up roll 45 for taking up the used abrasive cloth 42. Those rollers are rotatable. The pressing roll 44 is preferably made of rubber having a hardness of 30 degrees (JIS A).

As shown in FIG. 14, the take-up roll 45 is rotated in the direction indicated by an arrow through a driving gear 46 driven by a driving motor M1 and a gear 47 mounted to the take-up roll 45. The pressing roll 44 is rotated in the direction indicated by an arrow through a gear 48 meshed with the above-described gear 47 and mounted to the pressing roll 44. The direction of the pressing roll 44 rotation is opposite to the rotational direction of the silicone rubber roller 1 press-contacted to the pressing roll 44.

According to the Example of the removing apparatus, the housing 41 is supported for swinging about a pivot 49. By actuating the supporting arm 0 by a solenoid 51, the housing 41 is pivoted about the pivot 49, the pressing roll 44 is press-contacted to the silicone rubber layer 1 under a predetermined pressure, or it is moved away therefrom. In this example, the housing 41 is reciprocable in a direction of an axis of the silicone rubber roller 1 by driving an operating element 52 fixedly secured to the housing by a swash plate cam 53 driven by the driving motor M2.

In operation, when the driving motors M1 and M2 are driven, and the solenoid 51 is energized, the abrasive cloth 42 supplied from the supply roll 43 to the surface of the silicone rubber roller is pressed to the surface of the roller by the pressing roll 44 over the entire length of the roller and a predetermined pressure, 1 kg/cm$^2$, for example. At this time, the roller 1 is rotated, and simultaneously, the pressing roll 44, and therefore, the abrasive cloth 42 having a roughness sufficient to remove the quartz particles projected from the surface of the elastic layer without scraping the elastic layer, are reciprocated in the direction of the axis of the roller, by which the quartz particles on the roller surface is forcedly and property removed. Thus, a number of pores 30 is formed on the surface of the roller. The amount of the removed filler can be controlled by changing amount of the filler material, material of the abrasive cloth and the pressure or the like. As for the method of removing the quartz particles from the silicone rubber roller, they may be removed by a very strong sand-blasting treatment or the like, but the removal using the abrasive cloth is preferable, since it is capable of removing them with certainty.

While the invention has been described with reference to the structures disclosed herein, it is not confined to the details set forth and this application is intended to cover such modifications or changes as may come within the purposes of the improvements or the scope of the following claims.

What is claimed is:

1. An image fixing rotatable member, comprising:
   a silicone rubber layer, said rubber layer containing filler material and resin material; and
   a flourine resin layer formed on a surface of said silicone rubber layer by applying and sintering fluorine resin particles,
   wherein the surface of said silicone rubber layer has pores with a porosity of 3–50% by removal of said filler material from the surface.

2. A member according to claim 1, wherein the resin material in said silicone rubber layer is fluorine resin.

3. A member according to claim 1, wherein a bonding strength between said silicone rubber layer and said resin layer on said elastic layer is not less than 130 g/20 mm.

4. A member according to claim 1, wherein said filler material has a particle size larger than that of said resin before sintering.

5. An image fixing rotatable member, comprising:
   a rubber layer containing resin material and filler material; and
   a resin layer formed on said rubber layer by applying and sintering resin particles, wherein said filler material has a particle size larger than that of said resin particles.

6. A member according to claim 5, wherein said rubber layer is of silicone rubber, and said resin layer is of fluorine resin.

7. A member according to claim 5, wherein said rubber layer near said resin layer is provided with pores provided by removal of said filler material.

8. A member according to claim 7, wherein the resin material in said rubber layer is fluorine resin.

9. A member according to claim 7, wherein said filler material has a particle size larger than that of the resin material contained in said rubber layer.

10. A member according to claim 5, wherein a bonding strength between said elastic layer and said resin layer on said rubber layer is not less than 130 g/20 mm.

* * * * *

UNITED STATES PATENT AND TRADEMARK OFFICE
CERTIFICATE OF CORRECTION

Page 1 of 3

PATENT NO. : 5,217,532
DATED : June 8, 1993
INVENTOR(S) : SASAME, ET AL.

It is certified that error appears in the above-indentified patent and that said Letters Patent is hereby corrected as shown below:

TITLE PAGE

[56] REFERENCES CITED
   USPD:
   "4,618,917 10/1986 Sakurai" should read --4,616,917 10/1986 Sakurai--.

SHEET 5
   Fig. 9, "MAGNETRO" should read --MAGNETRON--.

COLUMN 4
   Line 27, "elements" should read --element--.
   Line 67, "controlling" should read --controlling the--.

COLUMN 5
   Line 62, "method," should read --methods,--.

COLUMN 6
   Line 66, "parti7" should read --particles--.
   Line 67, "cles" should be deleted.

COLUMN 7
   Line 6, "is" should read --was--.
   Line 13, "Kai7" should read --Kaisha,--.
   Line 14, "sha," should be deleted.
   Line 15, "dispersion D71," should read --dispersion D-1,--.
   Line 31, "are" should read --is--.

UNITED STATES PATENT AND TRADEMARK OFFICE
CERTIFICATE OF CORRECTION

PATENT NO. : 5,217,532
DATED : June 8, 1993
INVENTOR(S) : SASAME, ET AL.

It is certified that error appears in the above-indentified patent and that said Letters Patent is hereby corrected as shown below:

COLUMN 8
Line 22, "a" (second occurrence) should read --an--.
Line 66, "property" should read --property:--.

COLUMN 11
Line 48, "are" should read --are the--.

COLUMN 13
Line 16, "paraticles" should read --particles--; and "degrees" should read --50 degrees--.

Line 50, "partai-" should read --particles--.
Line 51, "cles" should be deleted.
Line 54, "pressurse" should read --pressure--.
Line 58, "paraticles" should read --particles--.
Line 59, "them" should read --then--.

COLUMN 14
Line 11, "be" should read --been--.

COLUMN 15
Line 1, "changing" should read --changing the--.

COLUMN 16
Line 25, "elastic" should read --rubber--.

UNITED STATES PATENT AND TRADEMARK OFFICE
CERTIFICATE OF CORRECTION

PATENT NO. : 5,217,532

DATED : June 8, 1993

INVENTOR(S) : SASAME, ET AL.

It is certified that error appears in the above-indentified patent and that said Letters Patent is hereby corrected as shown below:

COLUMN 16
   Line 25, "elastic" should read --rubber--.

Signed and Sealed this

Nineteenth Day of April, 1994

Attest:

BRUCE LEHMAN

Attesting Officer

Commissioner of Patents and Trademarks